Jan. 31, 1967 M. E. ULUG 3,302,125

INTERMEDIATE FREQUENCY AMPLIFIER

Filed June 6, 1963 2 Sheets-Sheet 1

INVENTOR:
MEHMET ESIN ULUG,
BY Donald N. Timbie
HIS ATTORNEY.

INVENTOR:
MEHMET ESIN ULUG,
BY Donald R. Timbie
HIS ATTORNEY.

United States Patent Office 3,302,125

Patented Jan. 31, 1967

3,302,125

INTERMEDIATE FREQUENCY AMPLIFIER

Mehmet E. Ulug, Etobicoke, Ontario, Canada, assignor to Canadian General Electric Company, Limited, Toronto, Ontario, Canada, a corporation of Canada Filed June 6, 1963, Ser. No. 286,123

2 Claims. (Cl. 330—46)

Figure 1:
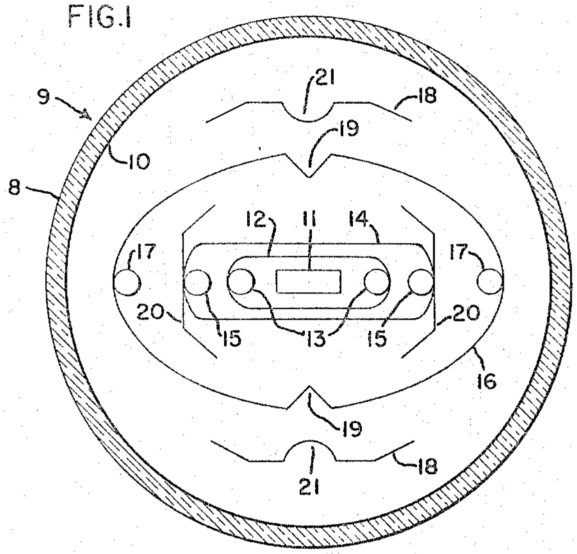

This invention relates to an amplifying circuit employing a novel electron discharge device or tube of the pentode type. More particularly it relates to broad-band I.F. (intermediate frequency) amplifying stages of television receivers in which said stages use the novel pentode with automatic gain control.

In a conventional amplifying stage employing a remote cut-off pentode, the automatic gain control voltage is applied to the control grid of the pentode. As this voltage varies, the space charge between the cathode and the control grid varies in magnitude. This means that the input capacitance of the tube varies, increasing as the space charge increases. Associated with this problem is the additional problem posed by electrons which fail to pass the suppressor grid and which return to the region of the cathode to oscillate in the space between the cathode and the control grid. This has the effect of loading the control grid and hence decreasing the input impedance.

Such changes in the parameters of the input circuit of the amplifying stage prevent the resonant frequency of the input circuit from being constant. However, in I.F. amplifying stages it is highly desirable that the resonant frequency of various circuits including such input circuits be held as nearly constant as possible, in order to avoid the distortion produced in the output signal by changes in the resonant frequency of the circuits.

Another disadvantage resulting from the use of conventional remote cut-off pentodes is the loss of gain resulting from the construction of the control grid. This grid is wound with a variable pitch, the spacing in the middle of the grid being greater than at the ends. Such a grid does not give as much gain as does a control grid which is closely wound with a constant pitch.

Still another disadvantage of conventional remote cut-off pentodes is the uneven heating of the screen grid, caused by the varying density of the stream of electrons passing from the cathode to the anode. This varying density is due to the varying pitch of the control grid.

The invention therefore contemplates, in a preferred embodiment, the combination of circuit means and a novel pentode having closely wound grids of constant pitch. The combination comprises an amplifying circuit in which the capacitance between the cathode and the control grid of the pentode is held substantially constant and in which the loading on the circuit of the control grid, due to electrons returning from the region of the suppressor grid, is substantially eliminated. In the novel circuit the automatic gain control voltage is impressed on the suppressor grid instead of on the control grid. In the novel pentode, the construction of the grids gives a high gain to the tube, but it means that many electrons will not be able to pass the suppressor grid in order to reach the anode. It is desirable to prevent such electrons from returning to the region between the cathode and the control grid. Means are provided to prevent such return of these electrons; these means comprise firstly electron-deflecting means cooperating with the suppressor grid, and secondly electron-collecting means cooperating with the screen grid. The said deflecting means may comprise a deformation in the contour of the suppressor grid, the deformation preferably being in the form of a V-shaped projection pointing toward the cathode and in the main path of the current. The said collecting means may comprise auxiliary electrodes in the form of plates electrically connected to the screen grid and positioned laterally of the main path of the current. The deflecting means act to deflect slow electrons toward the collecting means, which capture these electrons and thus prevent their return to the region between the cathode and the control grid.

By the above-described deflecting and collecting means, the input capacitance of the tube is kept substantially constant and the input impedance is kept large. These features, and others, of my novel tube are more fully described and claimed in my copending U.S. patent application Serial No. 270,320, filed April 3, 1963.

Since the input capacitance is kept substantially constant, a bypass capacitor may be connected in parallel with the cathode resistor. Previously, with conventional I.F. amplifiers, it was advisable to omit such a bypass capacitor in order to introduce some negative feedback to offset variations in the input capacitance. In my novel circuit, however, a bypass capacitor is preferably present, since it helps to maintain the input impedance of the tube at a large value and also helps to increase the transconductance of the tube.

Figure 2:
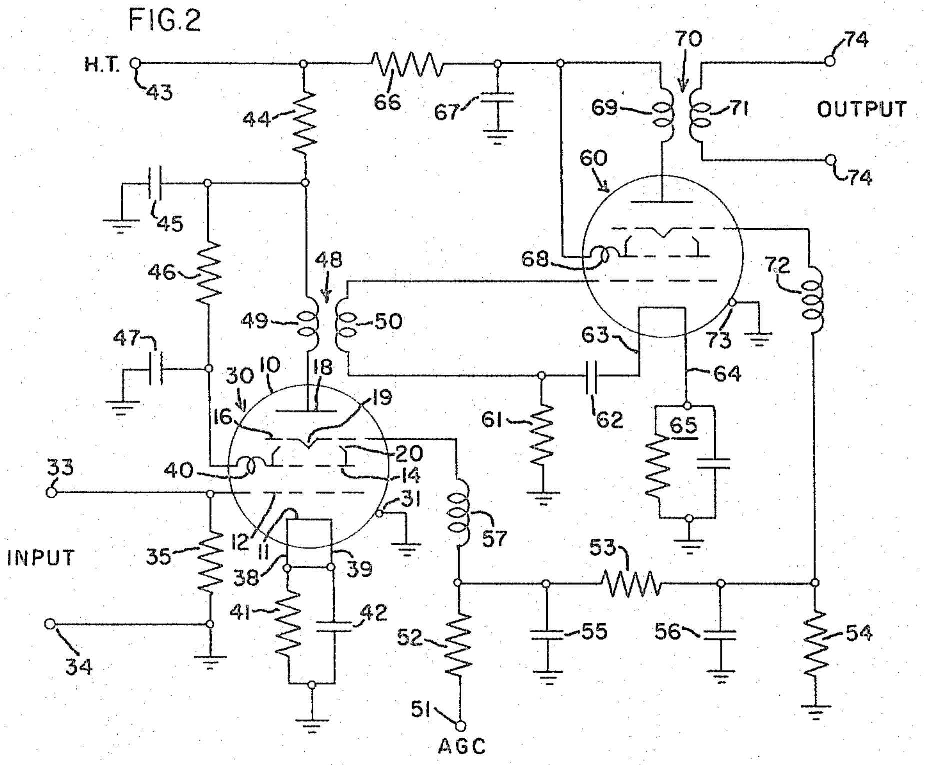
Figures 3, 4:
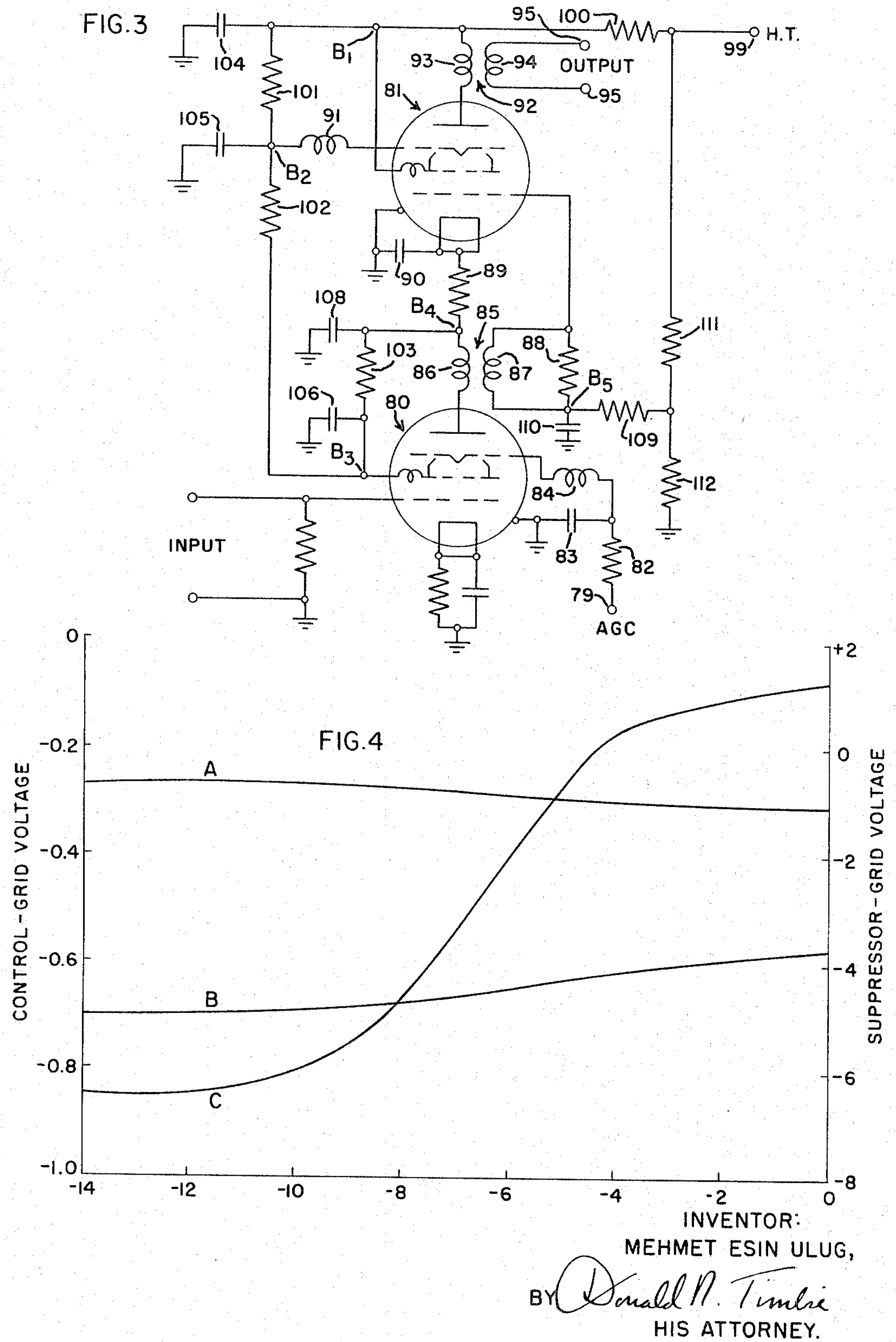

In drawings which illustrate embodiments of the invention,

FIGURE 1 is a schematic representation of a transverse cross-section of the novel tube used in the circuits of my invention, FIGURE 2 is a schematic diagram of a two-stage parallel circuit according to my invention, FIGURE 3 is a schematic diagram of a two-stage series circuit according to my invention, and FIGURE 4 is a graph depicting various bias voltages in the circuit of FIGURE 3.

In FIGURE 1, reference numeral 8 indicates the glass envelope of an evacuated electron discharge device or tube 9. A metallic shield 10 is provided inside envelope 8. Shield 10 provides electrostatic shielding for the internal structure of the tube. The shield and other electrodes of the tube are connected to pins (not shown) at the base of the tube according to techniques well known in the art. Shield 10 may be a conventional electrostatic shield, such as is well known in the art.

An electron-emissive cathode 11 is located axially in tube 9. Cathode 11 is preferably of the type which is indirectly heated, the heater not being indicated in FIGURE 1. Cathode 11 is indicated as being rectangular, and is to be understood as preferably having electron-emissive coatings on at least the two sides represented by the longer sides of the rectangle.

Surrounding and spaced from cathode 11 is a first or control grid 12 wound on and supported by rods 13. A second or screen grid 14 in turn surrounds and is spaced from control grid 12. Screen grid 14 is wound on and supported by rods 15. A third or suppressor grid 16 in turn surrounds and is spaced from screen grid 14, and is wound on and supported by rods 17. The several grids are coaxial with cathode 11, the various supporting rods being colinear with the long axis of the rectangle of the cathode. Such modes of construction are well known in the art.

Included inside shield 10 is an anode 18, indicated as being in two parts in FIGURE 1. The two parts are to be understood as being electrically connected together by means not shown, such as a conductive metallic ribbon for example. The anode 18 of course is separated from cathode 11 by the three grids. The two parts of the anode face the longer sides of the cathode and are so situated that the line joining the mid-points of the anodes would substantially bisect the cathode and be perpendicular to the longer sides thereof. The cathode and the two parts of the anode thus define two main paths for electrons emitted by the cathode. Each part of anode 18 has a humped portion 21 in the middle thereof, opposite the portions 19 of the suppressor grid, so as to keep the spacing between the anode and the suppressor grid roughly constant.

As more fully described in my aforementioned U.S. patent application, control grid 12 and screen grid 14 are closely wound, with a constant pitch. Suppressor grid 16 may be wound with either a constant pitch or a varying pitch. In a preferred embodiment for use in the circuits of the present invention, the suppressor grid is also closely wound with a constant pitch. With such grids, the tube has a high transconductance, but many electrons, particularly slow electrons, are unable to pass the suppressor grid to reach the anode. Ordinarily many of these electrons would tend to return to the region between the control grid and the cathode, to oscillate there with deleterious effects in the input circuit of the tube. To overcome this difficulty, means are provided to remove such electrons from the main paths of the current and to prevent their returning to the region of the cathode. These means include the V-shaped portions 19 of the suppressor grid and the auxiliary electrodes 20. V-shaped portions 19 of grid 16 lie in the main paths of the current and project toward the cathode. The portions 19 constitute deflecting means to deflect the majority of slow electrons toward the auxiliary electrodes 20. The latter capture these deflected electrons and thus remove them from the main paths of the current. Electrodes 20 also act as electrostatic shields between the anode 18 and support rods 13, and thus reduce the capacitance between the anode and the control grid. The auxiliary electrodes 20 may be welded to the rods 15, since they are preferably at about the same electrical potential as screen grid 14.

Various modifications of the above-described embodiment of tube 9 are possible. These are more fully disclosed in my aforementioned copending Canadian application. For example, instead of distorting the suppressor grid 16 as at 19 to form the deflecting means, separate deflecting means could be provided in the main paths of the currents.

FIGURE 2 shows a two-stage amplifier employing embodiments of my novel tube. The first stage comprises a tube 30 and associated circuits. The shield 10 of tube 30 is connected, as indicated at 31, to ground, which may be considered as a common reference terminal, in accordance with well known techniques. Input means are provided between the control grid 12 and ground. The input means may comprise, for example, input terminals 33 and 34 to which an input signal may be applied. Terminal 34 is grounded, and terminal 33 is connected to the control grid 12. The control grid of tube 30 is grounded through a resistor 35 of intermediate value, i.e., a few thousands of ohms; this value of resistance obviates instability of the tube due to the presence of gas in the tube or to the emission of electrons from grid 12.

A feature of my novel tube, not shown in FIGURE 1 but indicated in FIGURE 2, is that the cathode 11 has two leads 38 and 39 connected thereto, at respective opposite ends of the cathode. The provision of two leads helps to maintain the input impedance of the tube at a high value.

A feature of my novel tube, also not shown in FIGURE 1, is indicated in FIGURE 2 in tube 30, as an internal inductance 40. Inductance 40 represents the reactance of the lead which connects the screen grid 14 to a pin (not shown) at the base of the tube. This lead is designed to have such a length that, at the high frequency at which the tube is operated, the lead has an inductive reactance. This inductive reactance produces some regeneration in the circuit of FIGURE 2. In effect it reflects a negative component of reactance to the input circuit, thus offsetting self-inductance of the cathode leads and helping to maintain the input impedance of the tube at a high value. Screen-grid regeneration, per se, is well known in the art.

Means are provided to bias the control grid of tube 30 negatively with respect to the cathode. Preferably these comprise a resistor 41 and a capacitor 42 connected in parallel between ground and leads 38 and 39 which are connected together in short-circuit at their respective pins (not shown) at the base of the tube.

Suitable voltages are applied to anode 18 and screen grid 14 of tube 30, through appropriate circuits, from a source of high tension (not shown) which may be applied to a high-tension terminal 43. A first decoupling circuit comprises a resistor 44 and a capacitor 45 connected in series between terminal 43 and ground. One end of a screen grid resistor 46 is connected to the junction of decoupling resistor 44 and capacitor 45. The other end of resistor 46 is connected to the screen-grid pin of tube 30. Thus high tension can be applied through resistors 44 and 46 to the screen grid. From the junction of resistor 46 and the screen-grid pin a further decoupling capacitor 47 is connected to ground.

The output circuit of tube 30 comprises an output transformer 48 having a primary winding 49 and a secondary winding 50. Transformer 48 is tunable by means not shown, but well known in the art. Primary winding 49 is connected between anode 18 of tube 30 and the junction of decoupling resistor 44 and capacitor 45. Secondary winding 50 provides the output signal of the first stage of the amplifier of FIGURE 2.

Transformer 48 is of course preferably tuned to the given or intermediate frequency $f_0$ at which it is desired to operate the amplifier. The frequency at which the input circuit resonates is of course affected by the parallel network consisting of the capacitance between the cathode and the control gird in series with the biasing network in the cathode circuit. Since the present invention provides that the impedance of the said parallel network is kept substantially constant and at a high value, the resonant frequency of the input circuit is also substantially constant and the same as the given frequency $f_0$.

An AGC (automatic gain control) voltage may be applied by way of a terminal 51 through a series network of voltage-dropping resistors 52, 53, and 54 to ground. Between ground and the junction of resistors 52 and 53 a decoupling capacitor 55 is connected. A similar decoupling capacitor 56 is connected between ground and the junction of resistors 53 and 54. The said junctions thus provide AGC voltages for the amplifier. To apply AGC to the tube 30, an inductance 57 is connected between the suppressor grid 16 of tube 30 and the junction of resistors 52 and 53.

The inductance 57 is preferably tuned either above or below the intermediate frequency $f_0$. The inductance 57 may be tuned above $f_0$ by resonating it with the capacitance between the suppressor grid and ground. When so tuned above $f_0$, inductance 57 causes the suppressor grid to be substantially in phase with the control grid, thus improving the gain of the stage by several decibels without appreciably changing the shape of the response curve. When tuned below the desired spectrum of frequencies, inductance 57 substantially rejects unwanted frequencies over a broad band.

The deflecting means in tube 30 are indicated at 19, and the collecting means at 20, these means corresponding to the similarly numbered elements in FIGURE 1. These means ensure that the region between the cathode and the control grid is kept substantially free from slow electrons which fail to pass the suppressor grid and which would otherwise tend to return to the said region. As described above, this feature tends to keep constant the capacitance between the cathode and the control grid, thereby stabilizing the operation of the amplifier.

As the AGC voltage on the suppressor gird varies, the deflecting means 19 and the collecting means 20 cooperate to effect a switching action on the current in the tube. That is to say, these means determine how much current will be carried by the anode circuit and how much by the screen-grid circuit, the actual proportions depending on the value of the AGC voltage. Because these means 19 and 20 prevent a substantial proportion of the slow electrons from returning toward the cathode, the total current through the tube remains substantially constant, being divided between the anode circuit and the screen-grid circuit. Hence the bias on the control grid remains substantially constant. This feature is more fully explained in my above-mentioned copending application.

The foregoing substantially completes the description of a single stage of amplification in accordance with my invention. The novel circuit utilizing the novel tube permits stable operation of an amplifier having sufficient gain that two such stages will give substantially the same gain given by three stages of amplification of the prior art. Thus the two-stage amplifier of FIGURE 2 provides substantially sufficient gain to replace a three-stage amplifier of the prior art.

The second stage of the amplifier of FIGURE 2 comprises tube 60 and associated circuits. Tube 60 is of the same kind as tube 30. The input signal for tube 60 is provided by the secondary winding 50 of the ouput circuit of the first stage. Thus one end of winding 50 is connected directly to the control grid of tube 60. The other end of winding 50 may be connected through a resistor 61 to ground. The junction of winding 50 and resistor 61 is coupled by means of a capacitor 62 to lead 63, one of the cathode leads of tube 60. The other cathode lead 64 is connected through a parallel biasing network 65 to ground. Network 65 comprises a resistor and a capacitor connected in parallel, and is similar to the biasing network of tube 30, the latter network, of course, comprising resistor 41 and capacitor 42.

The cathode circuit of tube 60 could very well be identical to that of tube 30. In such a case, capacitor 62 would be omitted from the circuit, and lead 63 would be electrically connected to lead 64. The term "electrically connected" indicates substantially a short-circuit or resistanceless electrical connection. Also, with capacitor 62 omitted and lead 63 connected to lead 64, the resistor 61 could be omitted; winding 50 would then be connected between the control grid and ground. The indicated input circuit of tube 60 merely illustrates a possible alternative to the input circuit of tube 30; other alternatives will readily occur to those skilled in the art. Resistor 61, when used as shown in FIGURE 2, should preferably have similarly to resistor 35, an intermediate value of resistance.

High tension is provided for tube 60 from H.T. terminal 43. A second decoupling network comprises a resistor 66 and a capacitor 67 in series connected between terminal 43 and ground. The junction of resistor 66 and capacitor 67 may be electrically connected to the screen-grid pin of tube 60. The screen-grid lead of tube 60 is similarly designed to that of tube 30 to have an inductive reactance at the frequency $f_0$, this inductive reactance being indicated by inductance 68. Between the junction of resistor 66 and capactor 67 is also connected the primary winding 69 of an output transformer 70. The secondary winding 71 of transformer 70 provides an output signal by way of output terminals 74 to which the ends of winding 71 are connected. Transformer 70 of course is preferably tuned by well known means not shown, to the frequency $f_0$.

An inductance 72 connects the suppressor grid of tube 60 to the junction of resistors 53 and 54 of the AGC network, thus providing AGC voltage for tube 60. Inductance 72 is similar to inductance 57 of tube 30 and is similarly tuned above $f_0$ to perform the same function for tube 60 that inductance 57 performs for tube 30.

The electrostatic shield of tube 60 is preferably grounded as indicated at 73, similarly to the grounding 31 of the shield of tube 30. Thus the circuit and the operation of the second stage of FIGURE 2 are similar to those of the first stage.

Although FIGURE 2 depicts only two stages of amplification in parallel, it is to be understood that more than two stages may be used in parallel if desired. With the foregoing description of FIGURE 2, it will be within the scope of those skilled in the art to add further stages of amplification. It will also be apparent that the novel tube may be used in circuits embodying various modifications of those circuits disclosed, and for various applications other than the amplification of intermediate frequencies in a television receiver.

Values of the components which have been found suitable for the circuit of FIGURE 2 are given in Table I below.

*Table I*

| Component: | Value |
|---|---|
| Decoupling resistors **44**, **52**, **66**, ohms | 220 |
| Screen-grid resistor **46**, ohms | 3,300 |
| Cathode resistor of tube **30**, ohms | 22 |
| Cathode resistor of tube **60**, ohms | 82 |
| Control-grid resistors **35**, **61**, ohms | 2,200 |
| AGC resistor **53**, ohms | 330,000 |
| AGC resistor **54**, ohms | 180,000 |
| All capacitors, micromicrofarads | 820 |
| Inductances **57**, **72**, microhenries | approx. 1 |
| H.T., volts | 135 |

FIGURE 3 illustrates an embodiment of my invention in which two stages of amplification are connected in series, in contrast to the circuit of FIGURE 2, in which two stages are connected in parallel. The two-stage series circuit also provides substantially the same gain formerly obtained by three-stage circuits of the prior art.

From the point of view of alternating currents and voltages, the circuit of FIGURE 3 functions in much the same way as that of FIGURE 2. It is therefore mainly from the point of view of direct current that the circuit of FIGURE 3 is to be considered a series circuit. The series arrangement is to be preferred where the supply of current is limited, although a higher voltage is required in order to operate the series circuit at the same power.

The first stage of the circuit of FIGURE 3 comprises a tube 80 and associated circuits. The second stage comprises a tube 81 and associated circuits. Tubes 80 and 81 are of the same type as depicted in FIGURE 1 and used in the circuit of FIGURE 2.

The circuits associated with tube 80 are similar to those of tube 30 in FIGURE 2. The input circuit of tube 80 may be the same as the input circuit of tube 30.

Also the cathode circuit of tube 80 may be the same as that of tube 30. Similarly the electrostatic shield of tube 80 is grounded.

The suppressor grid circuit of tube 80 is essentially the same as that of tube 30. In the circuit of FIGURE 3, however, the AGC voltage is applied directly only to tube 80, and not to tube 81. Hence only a decoupling resistor 82 and a capacitor 83 connected in series between an AGC terminal 79 and ground, are required to provide a decoupled source of AGC voltage for tube 80. An inductance 84 serves to connect the suppressor grid to the said decoupled source of AGC voltage, this being of course the junction of resistor 82 and capacitor 83. It will be described below how AGC voltage is applied indirectly to tube 81.

The output circuit of tube 80 comprises an output transformer 85 having a primary winding 86 and a secondary winding 87. One end of primary winding 86 is connected to the anode of tube 80, and the other end to a junction labelled $B_4$, which is decoupled to ground by way of a capacitor 108. Output transformer 85 is tuned to $f_0$ by well known means not shown. The secondary winding 87 has one end connected to a junction $B_5$, and the other end connected to the control grid of tube 81. A damping resistor 88 may be connected in parallel with secondary winding 87 to provide some broadening of the band of output frequencies.

The screen-grid circuit of tube 80 is similar to that of tube 30. The screen grid of tube 80 is connected through a resistor 103 of intermediate value, i.e., a few thousand of ohms, to junction $B_4$. Resistor 103 thus corresponds to resistor 46 of the circuit of tube 30 in FIGURE 2. The junction of screen-grid resistor 103 and the screen grid is labelled $B_3$ for convenience. Junction $B_3$ is decoupled to ground by means of a capacitor 106.

The cathode leads of tube 81 are preferably electrically connected together and to one end of a cathode resitor 89. The other end of resistor 89 is connected to the junction $B_4$.

The cathode leads are also connected through a decoupling capacitor 90 to ground.

The output circuit of tube 81 comprises an output transformer 92 having a primary winding 93 and a secondary winding 94, tuned by well known means, not shown. Primary winding 93 is connected between a junction $B_1$ and the anode of tube 81. Secondary winding 94 is connected between output terminals 95, at which the output signal is available.

A source (not shown) of high tension may be connected between H.T. terminal 99 and ground. A decoupling resistor 100 is connected between terminal 99 and junction $B_1$. A capacitor 104 decouples junction $B_1$ to ground. Junction $B_1$ thus constitutes a decoupled source of high tension for the tubes.

A path for direct current is established between junctions $B_1$ and $B_3$ by way of a pair of resistors 101 and 102 of high value, connected in series. The purpose of these resistors will be explained below. The junction of resistors 101 and 102 is labelled $B_2$, and is decoupled to ground by a capacitor 105. An inductance 91 connects the suppressor grid of tube 81 to junction $B_2$. The screen grid of tube 81 is connected to junction $B_1$.

Inductances 84 and 91 of the circuit of FIGURE 3 perform essentially the same function as inductances 57 and 72 of the circuit of FIGURE 2. They are similarly tuned above the given frequency $f_0$.

Suitable potential for the control grid of tube 81 is provided by resistors 111 and 112, connected in series between H.T. terminal 99 and ground. Between junction $B_5$ and the junction of resistors 111 and 112 is connected a decoupling resistor 109. A decoupling capacitor 110 is connected between junction $B_5$ and ground. All the junctions $B_1$ to $B_5$ of the high-tension supply are therefore decoupled to ground, and hence, from the point of view of alternating currents and voltages may be considered to be substantially at ground potential.

As mentioned above, AGC voltage is applied only indirectly to tube 81. The action may be understood with reference to FIGURES 3 and 4. In FIGURE 4, curve A shows the variation of voltage on the control grid of tube 80, with respect to the cathode, as the AGC voltage applied to tube 80 varies. Curve B shows the variation of voltage on the control grid of tube 81, with respect to the cathode. Curve C shows the variation of voltage on the suppressor grid of tube 81, with respect to the cathode.

Suppose that the AGC voltage applied to the suppressor grid of tube 80 by way of terminal 79 is decreasing. This will cause the plate current of tube 80 to decrease, and the screen-grid current to increase, since more electrons will be deflected towards the collecting electrodes 20. Since substantially all of the screen-grid current of tube 80 traverses resistor 103, because of the high value of resistors 101 and 102, the voltage at junctions $B_3$ decreases. Because of the direct-current path established between junctions $B_3$ and $B_1$ by resistors 102 and 101, the potential of junction $B_2$ also decreases. Hence the voltage on the suppressor grid of tube 81 also decreases. By a similar argument, it can be seen that the voltage on the suppressor grid of tube 81 will increase if the AGC voltage applied to tube 80 increases. See curve C of FIGURE 4.

The cathode current of tube 80 remains fairly constant. Hence, the voltage of the control grid, relative to the cathode remains fairly constant, as attested to by curve A of FIGURE 4.

The voltage on the control grid of tube 81 is held substantially constant by the arrangement of resistors 111 and 112. Hence, the voltage between the control grid and the cathode of tube 81 also remains fairly constant, as indicated by curve B of FIGURE 4, since substantially all of the current of tube 80 flows through tube 81, and this current is substantially constant, as mentioned above. Hence the control-grid biases of both tubes of the circuit of FIGURE 3 are kept fairly constant, and thus are independent of changes in the AGC voltage.

Values of the components which have been found suitable for the circuit of FIGURE 3 are given in Table II below.

*Table II*

| Component: | Value |
|---|---|
| H.T. resistors 111, 112, ohms | 150,000 |
| D.C. resistor 101, ohms | 180,000 |
| D.C. resistor 102, ohms | 33,000 |
| Screen-grid resistor 103, ohms | 3,300 |
| Damping resistor 88, ohms | 3,900 |
| Control-grid resistor of tube 80, ohms | 2,200 |
| Cathode resistor 89, ohms | 220 |
| Cathode resistor of tube 80, ohms | 22 |
| Decoupling resistors 822, 100, 109, ohms | 220 |
| All capacitors, micromicrofarads | 820 |
| Inductances 84, 91, approx., microhenry | 1 |
| H.T., volts | 270 |

The circuit of FIGURE 3 is somewhat more economical, both in components and current, than that of FIGURE 2. The circuit has been used successfully for amplifying intermediate frequencies of about 45 mc./s., such as are used in television receivers. Gains of about 85 to 90 db have been achieved, such gains ordinarily being achieved with prior circuits using three stages of amplification. The tuning of the suppressor-grid inductance to about 60 mc./s. contributes about 3.5 db of gain, without producing any instability, to each stage of amplification.

The embodiments of the invention in which an exclusive property or privilege is claimed are defined as follows:

1. An electronic circuit for amplifying signals of a given frequency, said circuit comprising at least one amplifying stage of a number of similar stages, said stage comprising, in combination:

an electron discharge device comprising an evacuated envelope, said envelope enclosing a plurality of electrodes, said electrodes including a cathode having two distinct leads connected thereto to respective opposite ends thereof, a control grid wound with a constant pitch and surrounding and spaced from said cathode, a screen grid wound with a constant pitch and surrounding and spaced from said control grid, a suppressor grid surrounding and spaced from said screen grid, an anode spaced from said suppressor grid on the side away from said cathode, said cathode and said anode defining therebetween at least one main path for current, deflecting means electrically cooperating wtih said suppressor grid for deflecting slow electrons away from said main path, collecting means electrically cooperating with said screen grid for capturing said slow electrons deflected from said path;

a common reference terminal;

input circuit means electrically connected between said control grid and said common reference terminal;

biasing means electrically connected between said cathode and said common reference terminal to bias said cathode positively with respect to said control grid;

suppressor grid circuit means including automatic gain control circuit means capable of supplying an automatic gain control voltage, and inductance means tuned to a frequency different from said given frequency, said inductance means being electrically connected between said suppressor grid and said automatic gain control circuit means;

high tension means providing a source of operating voltage for said circuit;

output circuit means tunable to said given frequency, including an output transformer having a primary winding and a secondary winding, said primary winding having one end electrically connected to said anode, first connecting means to electrically connect the other end of said primary winding to said high tension means, and said secondary winding providing an output signal; second conducting means to connect said screen grid to said other end of said primary winding and shielding means to electrostatically shield said plurality of electrodes.

2. An electronic circuit as claimed in claim 1, wherein said cathode leads are electrically connected together externally of said electron discharge device, and said biasing means comprise a resistor and a capacitor connected in parallel between said cathode leads and said common reference level.

No references cited.

ROY LAKE, *Primary Examiner*.

N. KAUFMAN, *Assistant Examiner*.